United States Patent
Filippi et al.

(10) Patent No.: US 9,810,104 B2
(45) Date of Patent: Nov. 7, 2017

(54) WASTE HEAT RECOVERY IN A CHEMICAL PROCESS AND PLANT, PARTICULARLY FOR THE SYNTHESIS OF AMMONIA

(71) Applicants: Ermanno Filippi, Castagnola (CH); Raffaele Ostuni, Milan (IT)

(72) Inventors: Ermanno Filippi, Castagnola (CH); Raffaele Ostuni, Milan (IT)

(73) Assignee: Casale SA (CH)

(*) Notice: Subject to any disclaimer, the term of this patent is extended or adjusted under 35 U.S.C. 154(b) by 108 days.

(21) Appl. No.: 14/444,710

(22) Filed: Jul. 28, 2014

(65) Prior Publication Data
US 2014/0331672 A1 Nov. 13, 2014

Related U.S. Application Data

(63) Continuation of application No. 13/388,793, filed as application No. PCT/EP2010/056750 on May 17, 2010, now abandoned.

(30) Foreign Application Priority Data
Sep. 3, 2009 (EP) .................................... 09169330

(51) Int. Cl.
*F01K 25/08* (2006.01)
*C01B 3/38* (2006.01)
(Continued)

(52) U.S. Cl.
CPC ............. *F01K 25/08* (2013.01); *C01B 3/025* (2013.01); *C01B 3/34* (2013.01); *C01B 3/382* (2013.01);
(Continued)

(58) Field of Classification Search
CPC ...... F01K 25/08; F01K 25/106; C01C 1/0488; C01C 1/047; Y02P 20/544; Y02P 20/129;
(Continued)

(56) References Cited

U.S. PATENT DOCUMENTS 3,549,335 A * 12/1970 Grotz, Jr. ................ C01B 3/025
                                                                252/373
3,568,438 A    3/1971 Meienberg
(Continued)

FOREIGN PATENT DOCUMENTS

| CN | 1067223 A | 12/1992 |
|----|-----------|---------|
| EP | 2022754 A1 | 2/2009 |
| WO | 89/04914 A1 | 6/1989 |

OTHER PUBLICATIONS

International Preliminary Report on Patentability issued in connection with PCT/EP2010/056750.

*Primary Examiner* — Hoang Nguyen
(74) *Attorney, Agent, or Firm* — Akerman LLP

(57) ABSTRACT

A method for recovering waste heat in a process for the synthesis of a chemical product, particularly ammonia, where the product is used as the working fluid of a thermodynamic cycle; the waste heat is used to increase the enthalpy content of a high-pressure liquid stream of said product (11), delivered by a synthesis section (10), thus obtaining a vapor or supercritical product stream (20), and energy is recovered by expanding said vapor or supercritical stream across at least one suitable ex-pander (13); the method is particularly suited to recover the heat content of the syngas effluent after low-temperature shift.

13 Claims, 3 Drawing Sheets

(51) Int. Cl.
*C01B 3/02* (2006.01)
*C01B 3/34* (2006.01)
*C01B 3/48* (2006.01)
*C01C 1/04* (2006.01)
*F01K 25/10* (2006.01)

(52) U.S. Cl.
CPC ............. *C01B 3/48* (2013.01); *C01C 1/047* (2013.01); *C01C 1/0488* (2013.01); *F01K 25/106* (2013.01); *C01B 2203/0233* (2013.01); *C01B 2203/0244* (2013.01); *C01B 2203/0283* (2013.01); *C01B 2203/0415* (2013.01); *C01B 2203/0445* (2013.01); *C01B 2203/0475* (2013.01); *C01B 2203/068* (2013.01); *C01B 2203/0811* (2013.01); *C01B 2203/0833* (2013.01); *C01B 2203/84* (2013.01); *Y02E 20/326* (2013.01); *Y02P 20/123* (2015.11); *Y02P 20/124* (2015.11); *Y02P 20/129* (2015.11); *Y02P 20/52* (2015.11); *Y02P 20/544* (2015.11); *Y10T 29/49716* (2015.01)

(58) Field of Classification Search
CPC ....... Y10T 29/49716; C01B 2203/0811; C01B 2203/0445; C01B 2203/0283; C01B 3/382; C01B 3/48; C01B 3/34; C01B 3/025; C01B 2203/0233; C01B 2203/0244; C01B 2203/068; C01B 2203/0475; C01B 2203/0415; C01B 2203/0833; C01B 2203/84
USPC .................................. 60/647, 651, 653, 671
See application file for complete search history.

(56) References Cited

U.S. PATENT DOCUMENTS

| | | | |
|---|---|---|---|
| 3,705,009 A | 12/1972 | Dougherty | |
| 4,126,668 A * | 11/1978 | Erickson | C01B 3/06 252/373 |
| 4,414,191 A | 11/1983 | Fuderer | |
| 5,842,345 A | 12/1998 | Scharpf | |
| 6,282,880 B1 | 9/2001 | Wallace et al. | |
| 6,494,054 B1 | 12/2002 | Wong et al. | |
| 2002/0068768 A1* | 6/2002 | Wallace | C10G 35/00 518/728 |
| 2008/0314073 A1* | 12/2008 | Minor | C09K 5/045 62/498 |
| 2012/0141350 A1* | 6/2012 | Panza | C01B 3/359 423/359 |
| 2013/0039835 A1* | 2/2013 | Ostuni | C01B 3/025 423/359 |

* cited by examiner

WASTE HEAT RECOVERY IN A CHEMICAL PROCESS AND PLANT, PARTICULARLY FOR THE SYNTHESIS OF AMMONIA

CROSS-REFERENCE TO RELATED APPLICATIONS

This application is a continuation of U.S. patent application Ser. No. 13/388,793, filed Feb. 3, 2012, which is a national phase of PCT/EP2010/056750, filed May 17, 2010, which claims priority to European Patent Application No. 09169330.9, filed Sep. 3, 2009. The entire contents of these applications is incorporated herein by reference.

FIELD OF THE INVENTION

The present invention relates to waste heat recovery in a chemical process and plant. The invention is applicable for example to process and plants for the synthesis of ammonia.

PRIOR ART

Waste heat recovery is known in the art. In a chemical process, various waste heat sources can be available, e.g. from the cooling of intermediate product streams or flue gas of any combustion process. Heat available at a temperature of at least 400-500° C. is usually recovered by producing hot steam, which can be used in the process itself, or expanded in a turbine to produce energy. Heat available at a lower temperature is generally not suitable to produce energy and can be recovered e.g. by pre-heating some process stream(s). In some cases, however, the recovery of low-temperature heat may not be economically convenient.

In the rest of the description, reference will be made to heat recovery in a process and plant for the synthesis of ammonia, that is a preferred but not exclusive application of the invention.

A process for the production of ammonia and for the production of the corresponding make-up syngas is disclosed in EP-A-2022754. Basically, ammonia is produced by catalytic reaction of a make-up synthesis gas, in a synthesis loop operating at 80-300 bar. The make-up syngas is produced in a front-end section by reforming a hydrocarbon such as natural gas. More in detail, a desulphurized hydrocarbon is steam-reformed in a primary reformer, obtaining a first gas product containing CO, $CO_2$ and $H_2$ at a temperature around 800° C. Said first gas product is further reacted with air or oxygen in a secondary reformer or auto-thermal reformer (ATR), obtaining a second gas product at around 1000° C. Said second gas product is then treated in a series of equipments to remove carbon oxides and obtain a gas composition suitable for ammonia synthesis i.e. having a $H_2/N_2$ molar ratio close to 3:1. These equipments include CO shift converters where CO is converted to carbon dioxide and hydrogen; a $CO_2$-removal unit such as a $CO_2$ washing column where carbon dioxide is removed by scrubbing the gas with an appropriate solvent; a methanator reactor where the residual carbon oxides are catalytically converted to methane. The shift conversion usually takes place in a high-temperature shift reactor (HTS) at around 500° C., and then in a low-temperature shift reactor (LTS) operating around 200° C.

The heat released by the cooling of the hot gas effluent from the secondary reformer and from the combustion side of primary reformer is usually recovered by producing high-pressure superheated steam and preheating process streams. Said steam is made available for other process use, or converted into energy with a steam turbine. The low-temperature heat of the syngas effluent for example from the low-temperature shift reactor, however, is more difficult to recover.

The LTS reactor effluent has a relatively low temperature of around 200-220° C., and conversion into energy with a steam turbine is not attractive at such a low temperature. In the known art, the heat recovered from the cooling of the LTS reactor effluent is used for re-generating the solution (e.g. amine-based) of the $CO_2$-washing column; however this use is not efficient in terms of energy, and recent $CO_2$-removal processes such as physical washing or passing the syngas through a PSA device, no longer require a significant heat input.

Hence, in modern ammonia plants there is little or no use for the heat that may be recovered from the LTS reactor effluent. There are other potential sources of recoverable heat, e.g. the effluent from the methanator or the synthesis loop downstream the hot gas/gas exchanger, or the flue gas from the steam reformer which is generally sent to the stack at 150 to 300° C. However the prior art does not provide an effective way for full exploitation of these potential heat sources.

The same problem can be faced in other processes similar to that of synthesis of ammonia, comprising the steps of: obtaining at least one make-up reactant in a front-end section, reacting said least one make-up reactant in a synthesis section operating at a pressure higher than said front-end section, obtaining said product in a high pressure liquid state.

SUMMARY OF THE INVENTION

The aim of the invention is to provide efficient recover of the low-temperature heat which is potentially available in a chemical process as above, especially in a process for the synthesis of ammonia.

The basic concept of the invention is to use an available low-temperature heat source to increase the enthalpy of the high-pressure liquid product stream produced by the synthesis loop, and to use the product stream as the working fluid of a thermodynamic cycle, e.g. a Rankine cycle. The product stream can be fully or partly evaporated by the recovered waste heat; in some embodiments of the invention, the product stream is at a pressure above critical pressure, and heating results in a supercritical fluid stream.

Accordingly, an aspect of the invention is a process for the synthesis of a chemical product, comprising the steps of obtaining at least one make-up reactant in a front-end section, and reacting said at least one make-up reactant in a synthesis section, obtaining said product in a liquid state and at a high pressure, the process being characterized in that: a) at least a portion of the liquid product delivered by the synthesis section is heated by indirect heat exchange with a waste heat source made available by said process, obtaining an expandable stream of said product in a vapour state or supercritical state; b) said expandable stream is expanded to recover energy, obtaining an expanded stream, and c) said expanded stream is condensed by heat exchange with a suitable cooling medium, obtaining a product condensate stream.

In accordance with different embodiments of the invention, and also in accordance with the features of the chemical product, the product after heating can be in a vapour state or in a supercritical state, if the synthesis pressure is over the critical pressure of the product, and the temperature after heating is also over the critical temperature. Below the critical point, the liquid product can be fully or partly evaporated by the heat exchange with said waste heat source.

Preferably, said synthesis section is operating at a pressure higher than said front-end section.

The term of waste heat source is used with reference to heat made available at a relatively low temperature, where conventional energy recovery by production of high-pressure steam is not possible or not convenient; heat available at less than 350° C. may be considered waste heat; preferably the invention is applied to recovery of heat in the range 50-300° C., more preferably 100 to 250° C. and even more preferably around 200-250° C.

The waste heat source is any process stream(s) available at the above temperature ranges or any stream or flue gas coming from a combustion process. One or more process stream(s) can form the waste heat source.

A possible heat source is a process stream, or at least a portion thereof, taken from the front-end section. More preferably, the waste heat source or one of the waste heat sources is the make-up reactant, or at least a portion thereof.

In further embodiments, a flue gas stream from a combustion process, possibly after one or more heat recoveries at high temperature, forms the waste heat source, or one of the waste heat sources, of the invention. One example of this last case is the flue gas from a steam reformer, particularly a steam reformer of the front-end of a plant for the synthesis of ammonia, that is used to supply heat to react the feedstock at high temperatures, and after various heat recoveries is sent to the stack at a temperature between 150 and 300° C., thus still containing a significant heat amount at lower temperature.

The expansion of above step b) may take place in any suitable expander or more expanders in series or in parallel, for example a single or multi-stage turbine. Said expander is preferably connected to an electric generator, so that the mechanical energy of the expansion, collected by the expander, is converted into electric energy. The energy can be exported or used to feed auxiliaries such as compressors or pumps present in the plant. If convenient, the turbine can be mechanically connected to drive any compressor or pump.

Condensation at above step c) is carried out preferably at a temperature slightly greater than ambient temperature, so that the cooling fluid can be any fluid available at ambient temperature. Ambient air for example can be the cooling fluid. Hence, in a preferred embodiment, the condensation pressure is chosen to determine a condensation temperature slightly above ambient temperature, for example 35° C.

According to a further aspect of the invention, after said condensation step a portion of the product condensate is pumped again at a high pressure, and preferably at the same pressure of said synthesis section; said portion of the product condensate is then re-heated by heat exchange with said waste heat source or a further waste heat source, thus obtaining an expandable stream; after said heating, said expandable stream is then expanded to recover energy; after expansion, the stream is condensed back to liquid, thus forming a closed loop. The expansion and condensation of said closed loop may take place in the same expander(s) and condenser(s) of the above steps b) and c), or in separate equipments.

A preferred application of the invention is to improve the energy balance of a process and plant for ammonia synthesis. In this case, the make-up reactant is ammonia make-up syngas, and the liquid product is the liquid ammonia delivered by a high-pressure synthesis loop, usually operating at 80-300 bar pressure and preferably at 100-180 bar. The waste heat source stream, or one of the waste heat sources, is preferably a stream of ammonia make-up syngas, taken downstream a low-temperature shift (LTS) section or LTS reactor. Usually, the temperature of said stream after the LTS reaction is in the range 200-250° C.

Further waste heat can be recovered from the flue gas stream of the reformer, the effluent of the methanator of the front-end section, or the liquid ammonia itself. Hence, the waste heat source may comprise one or more of the following: the ammonia make-up syngas taken from a low-temperature shift reactor of a front-end reforming section; the ammonia make-up syngas effluent from a methanator of the front-end reforming section; the flue gas from a steam reformer of the front-end section; the hot product stream from the synthesis loop According to a preferred embodiment, liquid ammonia delivered by the synthesis loop at said pressure of 80-300 bar is heated to around 250° C., by heat exchange with said waste heat source(s), obtaining an expandable ammonia stream. Said expandable ammonia stream is expanded in a suitable expander such as ammonia turbine, and the ammonia effluent from said expander is condensed in a suitable air- or water-cooled condenser.

In more preferred embodiments, the pressure of the liquid ammonia stream at the outlet of the synthesis loop is in the range 100 to 180 bar, and the temperature is around 0° C., preferably in the range −30 (30 below zero) to +10° C. The heating at around 250° C. results in a supercritical fluid, the critical point of ammonia being 113 bar, 132° C. Said supercritical stream of ammonia is expanded through said expander or turbine, to recover energy; after expansion the ammonia stream is then condensed to liquid state. The condensation pressure, namely the expander outlet pressure, is preferably in the range 10-25 bar and more preferably around 14 to 20 bar, so that the condensation temperature is around ambient temperature, preferably slightly above the ambient temperature and more preferably around 35° C. The heat source for heating the liquid ammonia is preferably the make-up syngas effluent from a low-temperature shift reactor or the methanator or the synthesis loop downstream the hot gas-gas exchanger, or the flue gas from the reformer. All the make-up syngas effluent, or a part thereof, can form the heat source, according to embodiments of the invention, as well as the flue gas from the reformer.

In a particularly preferred embodiment, liquid ammonia at around 150 bar and 0° C. is heated to 200° C. by heat exchange with the make-up syngas exiting a LTS reactor at about 220° C.; a supercritical ammonia stream at 150 bar and 200° C. is obtained, and said stream is expanded in at least one turbine or another suitable expander, exiting at around 14 bar pressure. The ammonia effluent from said expander is then condensed in a water-cooled or air-cooled condenser, obtaining ammonia condensate at around ambient temperature, such as 30° C. More preferably, this condensate is further cooled by heat exchange with the cold liquid ammonia output of the synthesis loop.

According to one of the embodiments of the invention, a portion of the ammonia condensate can be pumped again to the high pressure of the loop, then evaporated in a suitable heat exchanger recovering further waste heat, expanded in the ammonia turbine or expander, and condensed in said condenser. Then, a portion of the ammonia evolves in a closed-loop Rankine cycle to produce energy.

The main advantage of the invention is that the waste heat is recovered in an efficient way, obtaining a valuable energy output. As a consequence, the overall efficiency of the process is improved. The use of ammonia as working fluid allows useful exploitation of the low-temperature heat, that would be unsuited, as stated above, for power generation via a steam turbine.

In fact, a low temperature heat source would only allow to produce saturated steam at a few bars pressure, which is not suited to efficient power generation via a steam turbine. In order to achieve a significant expansion ratio across the turbine, there would be the need of a low pressure output, resulting in a large flow rate and then in a large and expensive turbine stage. Moreover, due to poor inlet steam conditions, a steam turbine would also suffer the formation of condensate at the outlet, which is highly aggressive on the turbine blades. All the above drawbacks are overcome by use of the high-pressure ammonia as a working fluid.

Moreover, the invention also makes use of the significant pressure of the liquid product. Referring to the application to ammonia plants, in the prior art the pressure of the liquid ammonia stream is lowered through an expansion valve, which means that the pressure energy is lost. The invention provides efficient recovery of this pressure energy.

Another aspect of the invention is a plant adapted to carry out the above process. A plant according to the invention comprises a front-end section adapted to provide at least one make-up reactant, and a high-pressure synthesis section for reacting said at least one make-up reactant and obtaining a chemical product in a liquid state, the plant being characterized by comprising at least: a heat exchanger disposed to exchange heat between at least a portion of the liquid product delivered by the synthesis section, and a waste-heat source stream, obtaining an expandable stream of said product in a vapour state or supercritical state; an expander receiving said expandable stream and adapted to deliver mechanical energy produced by expansion of said stream, and a condenser downstream said expander, and disposed to condense the effluent of said expander.

According to embodiments of the invention, one or more heat exchanger(s), expander(s) and condenser(s) may be provided. According to the above disclosed preferred embodiments of the invention, the plant is preferably an ammonia plant, Another aspect of the invention is a method for revamping a plant for the synthesis of a chemical product, especially ammonia, by recovering waste heat from the front-end section of the plant in accordance with the above process. A plant for producing ammonia, comprising a front-end reforming section adapted to provide a make-up ammonia or syngas, and a high-pressure synthesis loop delivering liquid ammonia, is revamped by the following: arranging a heat exchange for heating at least a portion of the liquid ammonia product, by means of heat exchange with at least one source of waste heat, so obtaining a stream of heated, high-pressure ammonia stream in a vapour or supercritical state; the provision of at least an expander and preferably of a generator connected to said expander, for the expansion of said ammonia and the production of energy from said waste heat; the provision of a condenser adapted to condense the ammonia effluent at the outlet of said expander.

In a preferred embodiment, the waste heat source is the syngas effluent from the LTS reactor of the front-end. Hence, the method comprises the steps of providing at least one heat exchanger, for example a plate or tube heat exchanger, feeding at least a portion of the liquid ammonia produced in the synthesis loop to one side of said heat exchanger, and feeding at least a portion of the LTS reactor effluent to the other side of said exchanger. All the above-disclosed waste heat sources can also be used in the revamping process.

Still another aspect of the invention is a method for recovering waste heat in a process for the synthesis of a chemical product, particularly ammonia, where at least one make-up reactant is obtained in a front-end section, and reacted in a synthesis section operating at a pressure higher than said front-end section, obtaining said product in a liquid state and at a high pressure, the method being characterized in that: said waste heat is used to increase the enthalpy content of at least a portion of the liquid product delivered by the synthesis section, by indirect heat exchange, thus obtaining an expandable stream in a vapour or supercritical state, and energy is recovered by expanding said expandable stream across at least one suitable expander.

The following is a description of preferred and non-limiting embodiments.

DETAILED DESCRIPTION OF PREFERRED EMBODIMENTS

Figure 1:
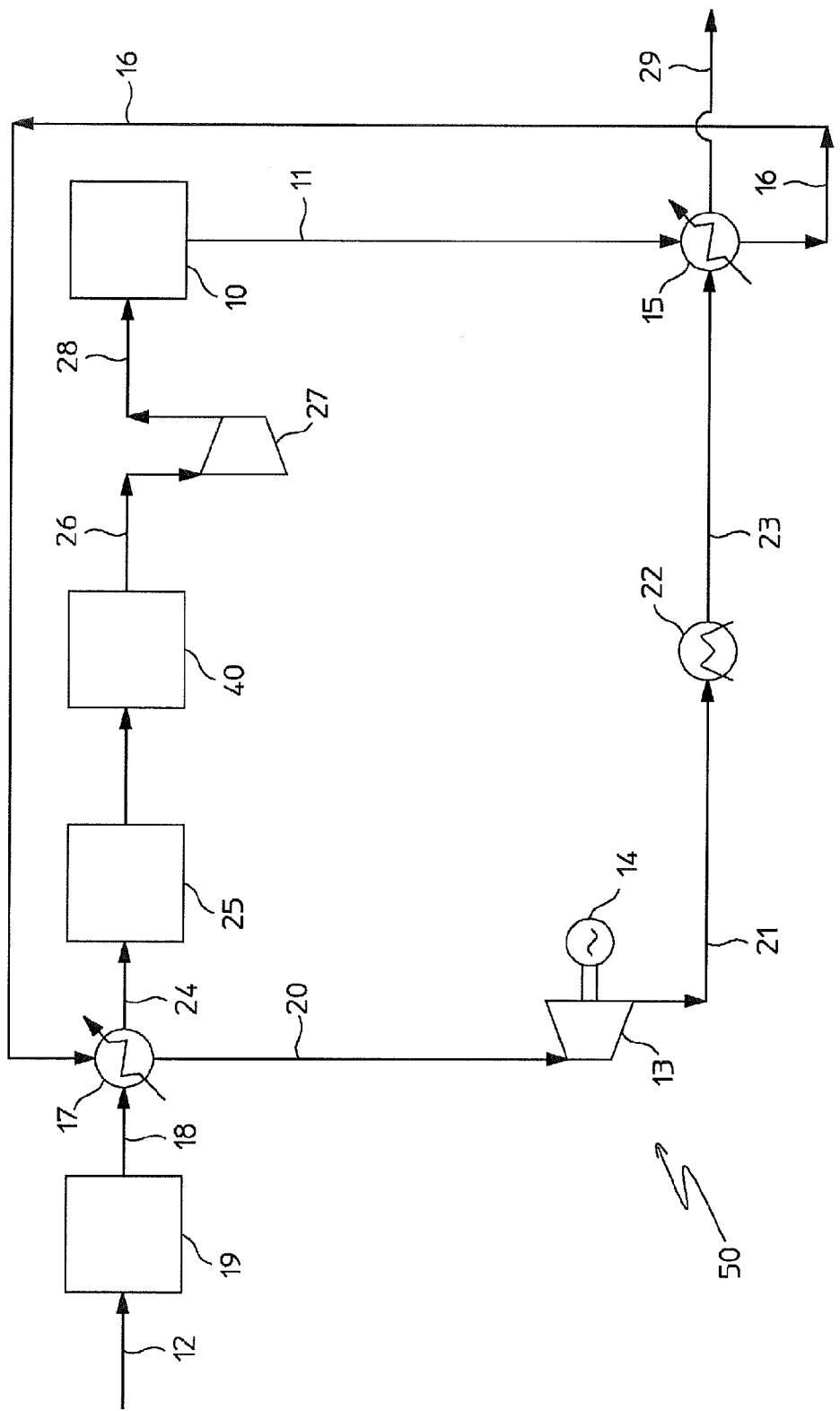
FIG. 1 is a block diagram of a plant for the synthesis of ammonia, featuring the recovery of the low-temperature heat content of the make-up syngas in accordance with one embodiment of the invention.

Referring to FIG. 1, a synthesis loop 10 delivers liquid ammonia 11 at a pressure of 80-300 bar and temperature around −30 to 10° C. The synthesis loop 10 is fed with a make-up synthesis gas which is produced in a front-end of the ammonia plant for example by steam reforming of natural gas or another suitable hydrocarbon.

The front-end may comprise a primary and a secondary reformer followed by a high-temperature and a low-temperature shift reactor. The LTS reactor is shown in FIG. 1 as 19. Downstream said LTS reactor, the make-up syngas passes in a $CO_2$ removal unit 25; the $CO_2$-free syngas 26 is further treated according to the needs, e.g. in a methanator, and then is fed to a main syngas compressor 27. The compressed syngas 28 is fed to the high-pressure synthesis loop 10, e.g. at a pressure of 150 bar.

According to one of embodiments of the invention, the plant of FIG. 1 comprises an energy recovering section 50 operating with ammonia as working fluid, and recovering heat from the LTS reactor effluent 18. The liquid ammonia 11, or at least a part thereof, is heated with waste heat recovered from said effluent 18, obtaining an expandable stream 20 which is the working fluid of a suitable expander, for example an ammonia turbine 13 connected to a generator 14.

Referring more in detail to FIG. 1, the liquid ammonia 11 is pre-heated in indirect preheater 15, by heat exchange with condensate ammonia 23 from the condenser 22 downstream the ammonia turbine 13. The pre-heated liquid ammonia 16 is fed to one side of a main indirect heat exchanger 17. The other side of said heat exchanger 17 receives the make-up syngas effluent 18 from the LTS reactor 19. The heat content of the effluent 18, usually between 200 and 250° C., is then used to heat the ammonia stream 16 and increase its enthalpy. The cooled syngas 24, after passage through said heat exchanger 17, is sent to the $CO_2$ removal unit 25.

The main heat exchanger 17 delivers the expandable ammonia stream 20, which is expanded across the ammonia turbine 13. The effluent 21 of said ammonia turbine 13 is condensed in a water-cooled or air-cooled condenser 22. The condensate ammonia 23 obtained in said condenser 22 is further cooled in the pre-heater 15, by heat exchange with the pre-heating liquid ammonia 11, leading to ammonia output 29. It should be noted that the ammonia liquid output 29, at a low pressure and temperature, is obtained after a useful exploitation of the energy pressure of the stream 11 as well as heat content of the effluent 18.

The pre-heater 15, the main exchanger 17 and the condenser 22 are heat exchangers known in the art, such as plate or tube heat exchangers, and are no further discussed.

The cooled syngas 24 at the output of the heat exchanger 17 is further treated in the $CO_2$-removal unit 25 and in other equipments, shown as block 40, to obtain the syngas 26 that feeds the synthesis loop 10.

Example: liquid ammonia 11 is available at 150 bar pressure and 0° C. Said ammonia 11 is pre-heated to 30° C. through the pre-heater 15, and further heated to 200° C. into the main exchanger 17, by the make-up syngas 18 entering the same exchanger 17 at a temperature of 220° C. A supercritical ammonia stream at about 150 bar and 200° C. enters the inlet of turbine 13. The turbine outlet stream 21 is at 14 bar and around 35° C. This level of pressure and temperature is chosen so that condenser 22 can be cooled with ambient air, i.e. it does not require refrigeration. In an ammonia plant capable of 2050 MTD (metric tons per day) of ammonia, the gross output of said turbine 13, at the above turbine inlet and outlet conditions, is about 5.4 MW.

Figure 2:
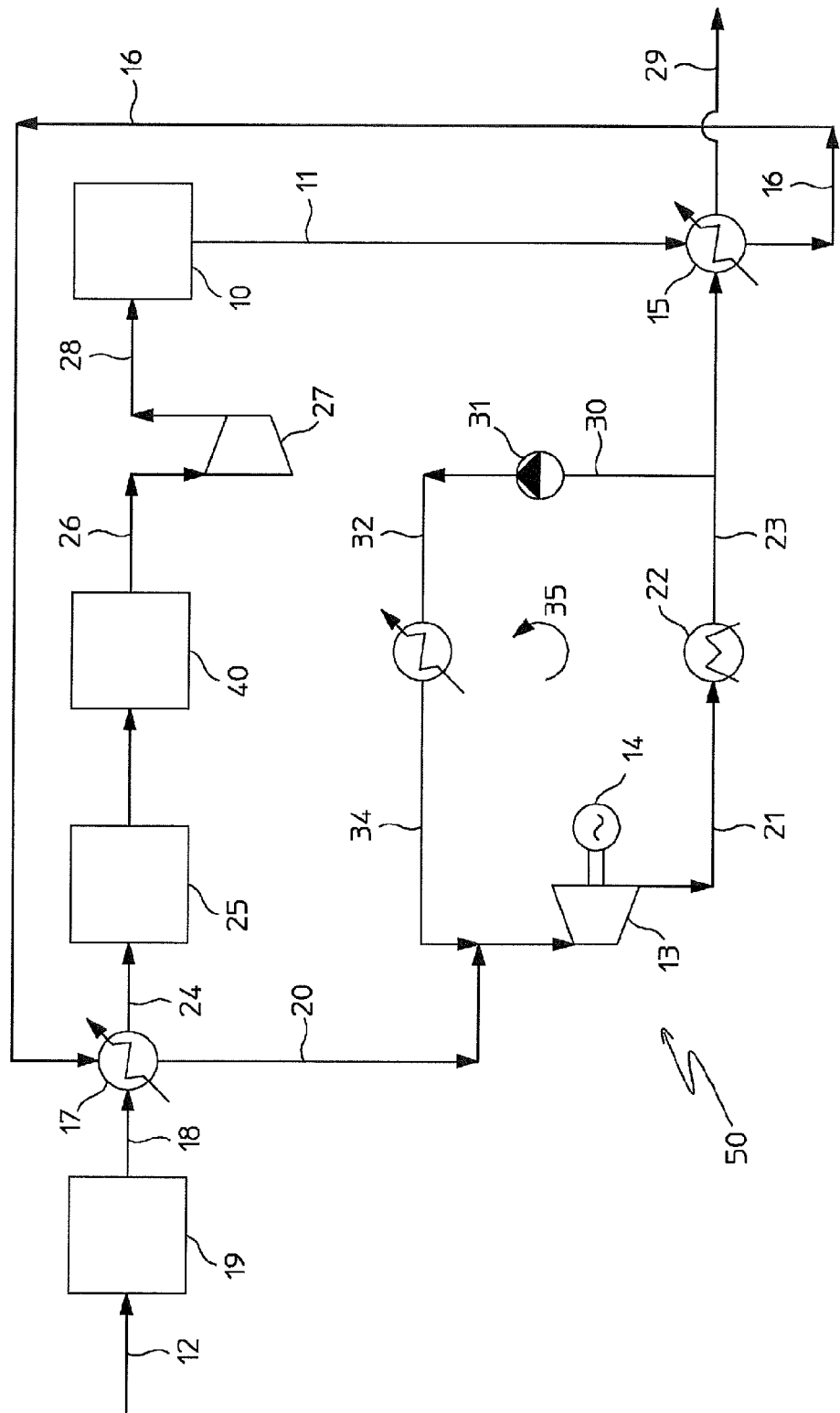
FIG. 2 is a variant of FIG. 1, where a portion of ammonia is used as working fluid in a closed-loop.

In a variant of the above embodiment (FIG. 2), a portion 30 of the condensed ammonia 23 is pumped in a pump 31 to the nominal pressure of the loop 10, i.e. the pressure of liquid ammonia 11. The resulting stream 32 is evaporated or heated in a further heat exchanger 33, obtaining a stream 34 which is expanded in the turbine 13. Hence, a portion of the ammonia evolves as the working fluid of a Rankine cycle 35. This variant is useful when another source of waste heat is available to provide the heat input of the exchanger 33.

According to further embodiments, the stream 34 may be fed at the inlet of the turbine 13 together with the stream 20, or to an intermediate stage. The heat exchanger 33 may receive heat by the same source of heat exchanger 17, or any other waste heat source available in the process. The stream 32 may also be heated again in the same exchanger 17.

Figure 3:
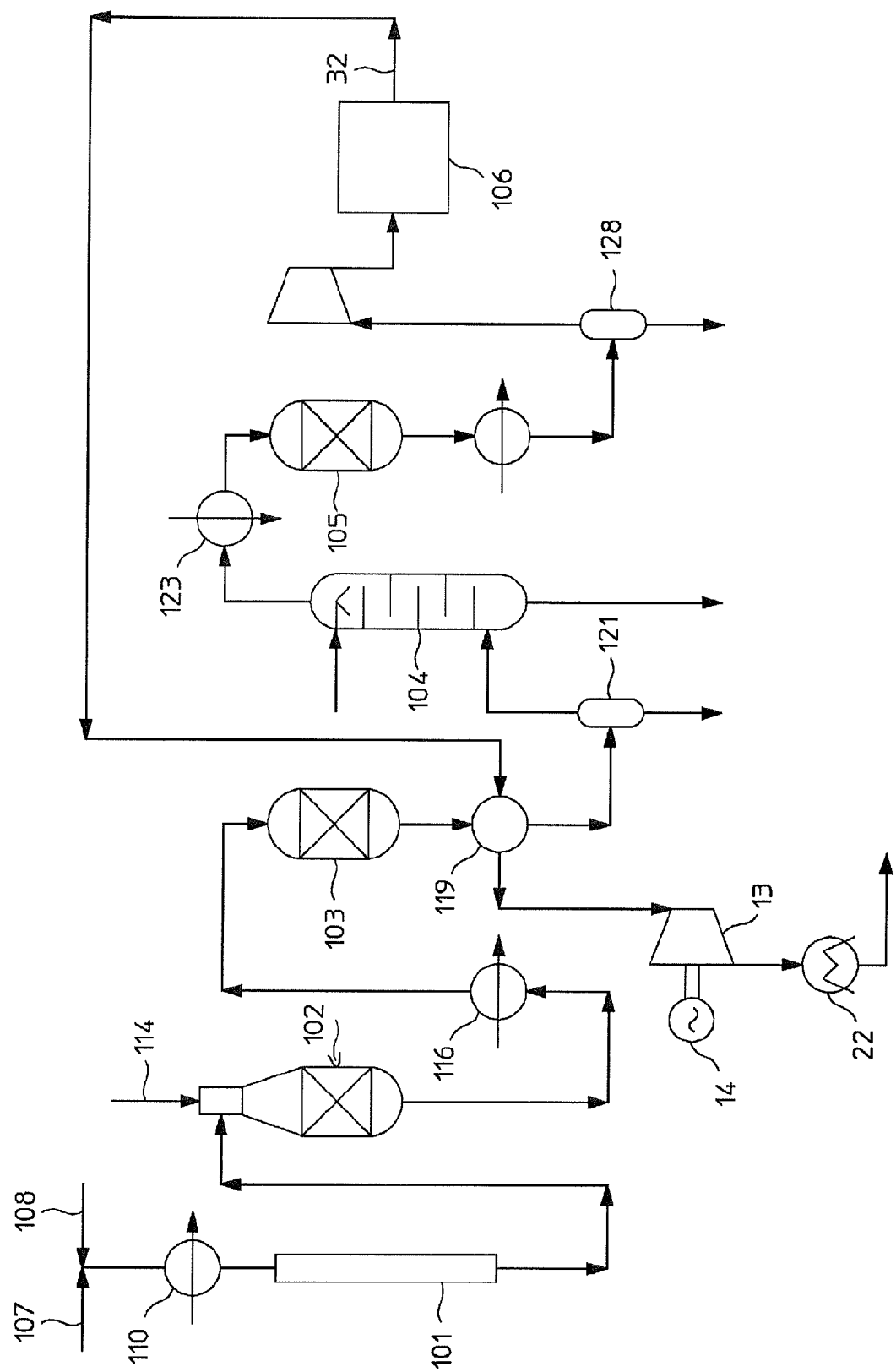
FIG. 3 is a scheme of a conventional plant for the synthesis of ammonia, modified according to the invention.

Another example is given in FIG. 3. A mixture of natural gas feed 107 and steam 108 are pre-heated in a preheater 110 and reacted in a primary reformer 101 and a secondary reformer 102, which receives a further oxidizer such as air supply 114.

Downstream the secondary reformer 102, the plant basically comprises a (series of) shift converter(s) 103, a $CO_2$ washing column 104, a methanator 105. The gas exiting the methanator is cooled in a heat exchanger, condensate is separated in a separator 128 and the make-up syngas is fed to ammonia synthesis loop 106 via a suitable syngas compressor. The ammonia so obtained is discharged from the synthesis loop 106 through the flow line 32.

The secondary reformer effluent at around 1000° C. and 60 bar is cooled in a heat exchanger 116 to around 350° C. and fed to the shift converter(s) 103 where the carbon monoxide content of the reformed gas is catalytically converted with unreacted steam to carbon dioxide plus and additional volume of hydrogen. The effluent of the shift converter, or last of shift converters in series, has a temperature around 220° C. and needs to be cooled near ambient temperature before feeding to a separator 121 upstream the washing column 104. The outlet gas flow from top of the column 104 is reheated to around 300° C. and fed to the methanator 105.

According to the invention, the plant is revamped by the provision of the main items such as ammonia expander 13, generator 14 and ammonia condenser 22, and by feeding the high-pressure ammonia stream 32, or at least a part thereof, to the gas cooler 119, to recover the heat released by the gas effluent of the shift converter(s) 103, and obtain a supercritical ammonia stream which is the input for the expander 13. The effluent of the condenser may be treated as in FIGS. 1 and 2. The gas cooler 119 may be provided as a new unit, during the revamping, if appropriate. Further and auxiliary items such as pumps, valves, etc. are not shown in the simplified scheme of FIG. 3.

The invention claimed is:

1. A process for the synthesis of a chemical product, comprising the steps of:
   obtaining at least one make-up reactant in a front-end section;
   reacting said least one make-up reactant in a synthesis section, obtaining said product in a high-pressure liquid state;
   heating at least a portion of the liquid product delivered by the synthesis section by heat exchange with a waste heat source made available by said process, obtaining an expandable stream of said product in a vapour state or supercritical state;
   expanding said expandable product stream to recover energy, obtaining an expanded product stream, and
   condensing said expanded product stream by heat exchange with a suitable cooling medium, obtaining a product condensate stream; and
   wherein a portion of the product condensate is pumped substantially at the same pressure of said synthesis section; said portion of the product condensate is then re-heated by heat exchange with said waste heat source or a further waste heat source; after said heating, said portion of product stream is then expanded to recover energy and condensed back to liquid, thus forming a closed loop.

2. The process according to claim 1, said waste heat source being one or more process stream(s) at a temperature below 350° C.

3. The process according to claim 2, said waste heat source comprising one or more of the following: a process stream taken from said front-end section; a process stream taken from said synthesis loop; a flue gas from a combustion process; a flue gas from a reforming process of said front-end section.

4. The process according to claim 1, said chemical product being ammonia, said liquid product being liquid ammonia at a pressure in the range 80-300 bar.

5. The process according to claim 4, wherein:
   said liquid ammonia at a pressure of 100-180 bar and a temperature in the range −30 to 10° C. is heated to around 250° C. by heat exchange with said waste heat source, obtaining a supercritical ammonia stream;
   the supercritical ammonia stream is then expanded to a condensation pressure between 10 and 20 bar; and
   the ammonia stream is then condensed at a condensation temperature corresponding to said condensation pressure, obtaining a low pressure ammonia condensate.

6. The process according to claim 5, the condensation pressure being around 14-16 bar and the condensation temperature being around 35° C., the condensation being effected by heat exchange of the condensing ammonia stream with cooling air or water at ambient temperature.

7. The process according to claim 4, said waste heat source comprising one or more of the following:
the ammonia make-up syngas taken from a low-temperature shift reactor of a front-end reforming section;
the ammonia make-up syngas effluent from a methanator of the front-end reforming section;
the flue gas from a steam reformer of the front-end section;
the hot product stream from the synthesis loop.

8. A plant for the synthesis of a chemical product, the plant comprising a front-end section adapted to provide at least one make-up reactant, and a high-pressure synthesis section for reacting said least one make-up reactant and obtaining said chemical product in a liquid state, the plant being characterized by comprising an energy recovery section, said energy recovery section comprising at least:
a heat exchanger disposed to exchange heat between at least a portion of the liquid product delivered by the synthesis section, and a waste-heat source stream, obtaining an expandable stream of said product in a vapour state or supercritical state;
an expander receiving said expandable stream in vapour state or supercritical state, and delivering mechanical energy produced by expansion of said stream, and
a condenser downstream said expander, and disposed to condense the effluent of said expander;
wherein a portion of the product condensate is pumped substantially at the same pressure of said synthesis section; said portion of the product condensate is then re-heated by heat exchange with said waste heat source or a further waste heat source; after said heating, said portion of product stream is then expanded to recover energy and condensed back to liquid, thus forming a closed loop.

9. A method for revamping a plant for producing ammonia, the plant comprising a front-end reforming section adapted to provide a make-up ammonia syngas, and a high-pressure synthesis loop, the method comprising the steps of:
arranging a heat exchange for heating at least a portion of the liquid ammonia product, by means of heat exchange with at least one source of waste heat, so obtaining a stream of heated, high-pressure ammonia stream in a vapour or supercritical state;
providing the provision of at least an expander, for the expansion of said ammonia stream and the production of energy from said waste heat; and
providing a condenser adapted to condense the ammonia effluent at the outlet of said expander;
wherein a portion of the product condensate is pumped substantially at the same pressure of said synthesis section; said portion of the product condensate is then re-heated by heat exchange with said waste heat source or a further waste heat source; after said heating, said portion of product stream is then expanded to recover energy and condensed back to liquid, thus forming a closed loop.

10. The method according to claim 9, said source of waste heat being one or more of the following: the ammonia make-up syngas taken from a low-temperature shift reactor of the front-end reforming section; the ammonia make-up syngas effluent from a methanator of the front-end reforming section; the flue gas from a steam reformer of the front-end section; the hot product stream from the synthesis loop.

11. A method for recovering waste heat in a process for the synthesis of a chemical product, where at least one make-up reactant is obtained in a front-end section, and reacted in a synthesis section operating at a pressure higher than said front-end section, obtaining said product in a liquid state and at a high pressure, the method comprising the steps of:
using said waste heat to increase the enthalpy content of at least a portion of the liquid product delivered by the synthesis section, by indirect heat exchange, thus obtaining an expandable product stream in a vapour or supercritical state, and
recovering energy by expanding said vapour or supercritical stream across at least one suitable expander;
wherein a portion of the product condensate is pumped substantially at the same pressure of said synthesis section; said portion of the product condensate is then re-heated by heat exchange with said waste heat source or a further waste heat source; after said heating, said portion of product stream is then expanded to recover energy and condensed back to liquid, thus forming a closed loop.

12. The process according to claim 1, said waste heat source being one or more process stream(s) at a temperature in the range 50-300° C.

13. A method for revamping a plant for producing ammonia, the plant comprising a front-end reforming section adapted to provide a make-up ammonia syngas, and a high-pressure synthesis loop, the method comprising the steps of:
arranging a heat exchange for heating at least a portion of the liquid ammonia product, by means of heat exchange with at least one source of waste heat, so obtaining a stream of heated, high-pressure ammonia stream in a vapour or supercritical state;
providing the provision of at least an expander and a generator connected to said expander, for the expansion of said ammonia stream and the production of energy from said waste heat; and
providing a condenser adapted to condense the ammonia effluent at the outlet of said expander;
wherein a portion of the product condensate is pumped substantially at the same pressure of said synthesis section; said portion of the product condensate is then re-heated by heat exchange with said waste heat source or a further waste heat source; after said heating, said portion of product stream is then expanded to recover energy and condensed back to liquid, thus forming a closed loop.

* * * * *